United States Patent
Tsuru et al.

(10) Patent No.: US 7,512,321 B2
(45) Date of Patent: Mar. 31, 2009

(54) VIDEO RECORDING/PLAYBACK SYSTEM AND METHOD FOR GENERATING VIDEO DATA CAPABLE OF PROVIDING INFORMATION FOR SUBSTITUTING AN ADVERTISEMENT THEREBY

(75) Inventors: Yasutaka Tsuru, Yokohama (JP); Mitsuo Nakajima, Yokohama (JP); Yoshiaki Mizuhashi, Yokohama (JP); Katsunobu Kimura, Yokohama (JP); Masaaki Matsukawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 899 days.

(21) Appl. No.: 10/602,919

(22) Filed: Jun. 25, 2003

(65) Prior Publication Data

US 2004/0005143 A1 Jan. 8, 2004

(30) Foreign Application Priority Data

Jul. 2, 2002 (JP) .............................. 2002-192949

(51) Int. Cl.
H04N 7/00 (2006.01)
H04N 5/00 (2006.01)
(52) U.S. Cl. ........................................ 386/95; 386/125
(58) Field of Classification Search .................. None
See application file for complete search history.

(56) References Cited

U.S. PATENT DOCUMENTS

| | | | |
|---|---|---|---|
| 6,100,941 | A | 8/2000 | Dimitrova et al. |
| 6,324,694 | B1 | 11/2001 | Watts et al. |
| 6,343,179 | B1 | 1/2002 | Suito et al. |
| 6,614,844 | B1 * | 9/2003 | Proehl ................... 375/240.08 |
| 7,146,631 | B1 | 12/2006 | Tanaka et al. |
| 2002/0001459 | A1 | 1/2002 | Fujic et al. |
| 2003/0037068 | A1 * | 2/2003 | Thomas et al. ............. 707/200 |

FOREIGN PATENT DOCUMENTS

| | | |
|---|---|---|
| EP | 0 363 847 A | 4/1990 |
| JP | 2000-165335 | 6/2000 |
| JP | 2001-136471 | 5/2001 |
| JP | 2001-204005 | 7/2001 |
| JP | 2001-266482 | 9/2001 |
| WO | WO 03/090401 A1 * | 10/2003 |

OTHER PUBLICATIONS

Japanese Office Action, issued in Japanese Patent Application No. JP 2002-192949, dated on Jul. 18, 2007.

* cited by examiner

*Primary Examiner*—Thai Tran
*Assistant Examiner*—Heather R Jones
(74) *Attorney, Agent, or Firm*—McDermott Will & Emery LLP (57) ABSTRACT

A device enabling simultaneous recording and playback allows commercials to retain their advertisement function even if the commercials are skipped over during a playback process. By digital watermarking, CM-substitute data is embedded in program data among video signals broadcasted from a broadcast station. CM-substitute data is to present information such as a particular sponsor name and commodity name on display. The video recording/playback device includes a randomly accessible storage unit and has a simultaneous recording/playback capability. If commercial video is skipped over and is not rendered by playback, the CM-substitute information is superimposed on the rendered video of the program associated with the commercial. Thus, the commercial advertisement function can be retained.

13 Claims, 10 Drawing Sheets

PROGRAM VIDEO

FIG. 5(b)

CM-SUBSTITUTE INFORMATION

SPONSORED BY * * (K. K.)

FIG. 5(c)

OUTPUT VIDEO
(WHEN ASSOCIATED COMMERCIAL
HAS NOT BEEN RENDERED)

VIDEO RECORDING/PLAYBACK SYSTEM AND METHOD FOR GENERATING VIDEO DATA CAPABLE OF PROVIDING INFORMATION FOR SUBSTITUTING AN ADVERTISEMENT THEREBY

BACKGROUND OF THE INVENTION

The present invention relates to a video recording/playback system for recording and playback of video data such as, for example, movies and dramas.

Various types of television broadcasting are performed through terrestrial and satellite broadcast channels, cable communication networks, and the like. Television companies that provide TV broadcasts to viewers free of charge run on revenue in commercials which are broadcasted during intermissions of TV programs. Advertisers pay for the rights to air their commercials on the presupposition that viewers would view the commercials. Because the commercial effect is greater for time zones or TV programs expected to have a high viewing rate, the TV companies set commercial charges, considering viewing rates.

Meanwhile, a consumer video recording/playback device called a Personal Video Recorder (PVR) has lately been introduced to the market. In functionality, the PVR is similar to a Video Tape Recorder (VTR). The VTR uses magnetic tape media as recording media, whereas the PVR uses randomly accessible disk media such as a Hard Disk Drive (HDD) and rewritable Digital Versatile Disk (DVD) as recording media.

Accordingly, the PVR has a simultaneous recording/playback capability which is not supported by the VTR, this capability enabling a playback of recorded video while recording video such as TV programs. Using the simultaneous recording/playback capability, the PVR user can immediately view recorded video pictures rendered by playback while continuing recording before the completion of recording a TV program; that is, the user does not have to wait until the recording finishes to view the TV program. Even when the PVR is recording another TV program, the user can play back a previously recorded program and enjoy it.

SUMMARY OF THE INVENTION

Although the above-described simultaneous recording/playback capability of the PVR is convenient for the user, this capability makes it possible to skip over commercials and view only TV programs. Specifically, the user starts recording a desired program at the start time of the program and starts the playback of the recorded part of the program from the beginning at a time delayed for the time of commercials inserted in the program being broadcasted. By skipping over the inserted commercials and playing back the program only, the user can have viewed the recorded program at almost the same time that the program being broadcasted is over.

The PVR enables the user to view a commercial-cut version of an on-aired program almost in real time. However, if this manner of cutting commercials prevails, the advertisement effect of commercials inserted in TV programs would decrease greatly. In consequence, advertisers might come to think that spot commercials are not effective much and the number of advertisers that sponsor TV programs might decrease, which, eventually, might lead to a battering of profits of television companies The present invention has been made to address the above-described problem and its object is to provide a video recording/playback system which incorporates substitute information for sub data which has been cut during a playback process into the main data following the sub data and can thereby notify the viewer of the presence of the sub data. Other objects and advantages of the invention will be apparent from detailed descriptions which will be provided later.

In order to resolve the above-described problem, a video recording/playback system of the present invention is comprised of a storage means, a playback means, and a control means.

The storage means receives and stores video data which consists of sets of main data and sub data falling under different categories, the sets of main data and sub data being sequenced along time axis. The playback means reads main data and sub data from the storage means and renders video contents of these data. The control means judges whether sub data has been read from the storage means and its video rendered and, unless sub data video has been rendered, incorporates substitute data that has been associated in advance with the sub data into its main data, and renders main video accompanied with substitute information.

The above-noted "different categories" mean that the purpose of providing the video content is different. Specifically, for example, main data refers to a TV program and sub data refers to a spot commercial. Sets of main data and sub data are sequenced along time axis and the playback means in normal playback mode reads the main data and sub data sets from the storage means and renders their video in sequence in which they were stored. If sub data has been skipped over in a playback process, it is detected by the control means. The control means incorporates substitute data that has been associated in advance with the sub data into its main data and renders main video accompanied with substitute information. On the thus presented video images of the main data, the substitute information is superimposed, so it can draw the viewer's attention to the presence of the sub data which has not been rendered. As examples of the substitute information for sub data, specifically, an advertiser name, corporate logo, commodity name to advertise, etc. can be mentioned. Such substitute information should be shown in a suitable position that it does not interfere with the view of main video, such as at the top or the bottom of the display area of main video. The substitute information can inform the viewer of the presence of the sub data which was skipped over in the playback process and produce an advertisement effect instead of the sub data.

The above-noted condition that "unless sub data video has been rendered" is, of course, true for a case where the entire sub data has not been rendered by playback and includes a case where only a part of the sub data has been rendered by playback or a case where the sub data has not been rendered in normal condition. For example, if only I pictures out of MPEG format data are rendered by playback or if the user inputs a skip command during a sub data playback after confirming the start of rendering the sub data, the control means will determine that the user cannot view the complete information from the sub data and control the playback such that the substitute information for the sub data will be superimposed on the video of the main data following the sub data.

BRIEF DESCRIPTION OF THE DRAWINGS

These and other features, objects, and advantages of the present invention will become more apparent from the following description when taken in conjunction with the accompanying drawings wherein.

DETAILED DESCRIPTION OF PREFERRED EMBODIMENTS

1. Embodiment 1

Figure 1:
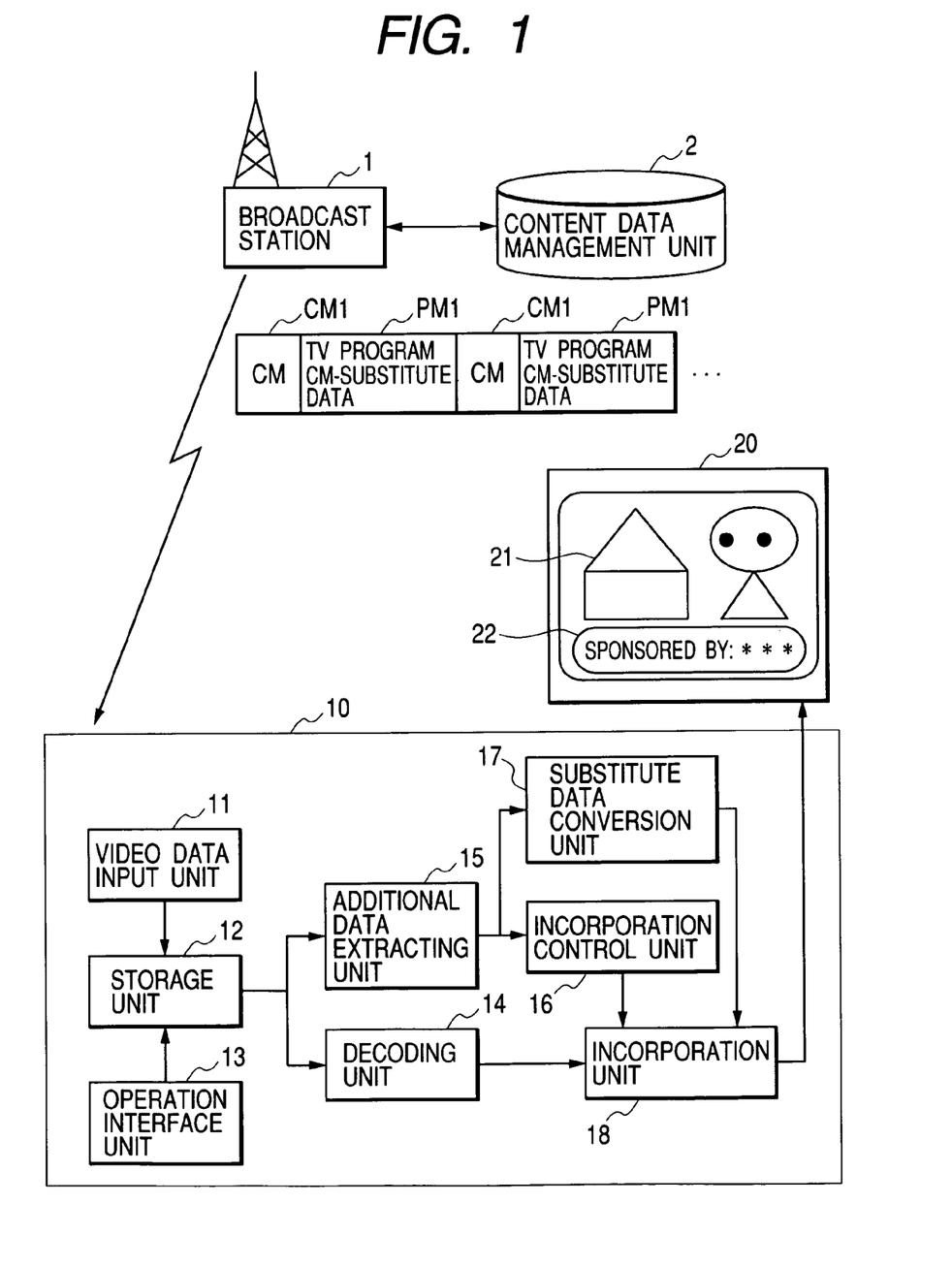
FIG. 1 is a schematic diagram showing an entire configuration of a video recording/playback system in accordance with a preferred Embodiment 1 of the present invention.

FIG. 1 is a schematic diagram showing an entire configuration of a video recording/playback system of the present invention.

A broadcast station 1 transmits a variety of TV program data and commercial data which are managed on a content data management unit 2 to TV viewers via transmission means which may be, for example, terrestrial broadcasting, satellite broadcasting, a cable communication network or the Internet and the like. Video data that is transmitted from the broadcast station 1 to a video recording/playback device 10 that a TV viewer uses consists of sets of TV program data PM and commercial data CM which is inserted in position predetermined by a schedule. Video data organization will be described later with reference to FIG. 2.

The video recording/playback device 10, which is built as a microcomputer system, is comprised of a video data input unit 11, storage unit 12, operation interface unit 13, decoding unit 14, additional data extracting unit 15, incorporation control unit 16, substitute data conversion unit 17, and incorporation unit 18, which will be respectively described later.

The video data input unit 11 receives video data through a wireless or wired transmission channel. Encoded video data (video signal sequences) is input to the video data input unit 11. While a certain encoding method, for example, MPEG2 is now commonly used for TV broadcasting, there is no restriction on encoding in the present invention and any encoding method that is compatible with a digital watermarking technique can be applied.

Received video data is stored on the storage unit 12. It is preferable that the storage unit 12 comprises a randomly accessible storage device such as, for example, a hard disk drive (HDD), digital versatile disk (DVD) storage, or a rewritable semiconductor memory device. In response to a recording control signal or playback control signal input through the operation interface unit 13, the storage unit 12 writes coded video data to a randomly accessible recording medium or reads video data from the recording medium.

Video data read from the storage unit 12 is input to the decoding unit 14 and the additional data extracting unit 15. The decoding unit 14 decodes and decompresses coded video data and outputs decoded and decompressed video data to the incorporation unit 18.

The additional data extracting unit 15 extracts additional data from coded video data. Additional data is data added to video data and refers to ID code, attribute data, and CM-substitute data herein. The additional data extracting unit 15 extracts additional data which was embedded in video data by a digital watermarking technique.

Simply explaining the digital watermarking technique, it incorporates predefined data in a form not perceptible by human senses into video or audio data. Several methods are available for embedding additional data in moving picture data, which include, for example, a method of embedding additional data in picture data (I pictures) not subjected to MPEG (Moving Pictures Experts Group) inter-frame compression; a method of embedding additional data, using a motion vector applied to MPEG pictures; and a method of embedding additional data, using predictive residuals in MPEG coding schemes.

ID code and attribute data extracted by the additional data extracting unit 15 are input to the incorporation control unit 16 and CM-substitute data extracted is input to the substitute data conversion unit 17. The incorporation control unit 16 judges whether commercial data has been skipped over in a playback process from the ID code and attribute data and determines whether CM-substitute information is to be superimposed on the following program video, which will be specifically described later.

The substitute data conversion unit 17 generates data to be incorporated into program data from which video is rendered by playback, based on the extracted CM-substitute data. As the data to be incorporated into program data; text, still pictures, moving pictures, and audio data can be mentioned. If text superimposition is shown, CM-substitute data includes, for example, JIS Kanji code sequence, font size, positions where the text is to be shown, and other data and the substitute data conversion unit 17 generates a bitmap image of the text superimposition, based on the above-mentioned data.

The incorporation unit 18 incorporates the generated CM-substitute data into the decompressed program video data and outputs resultant video signals if an incorporation control signal is ON from the incorporation control unit 16. If the incorporation control signal from the incorporation control unit 16 is OFF, the incorporation unit 18 outputs only the video signals of the decompressed program data.

Figure 2A:
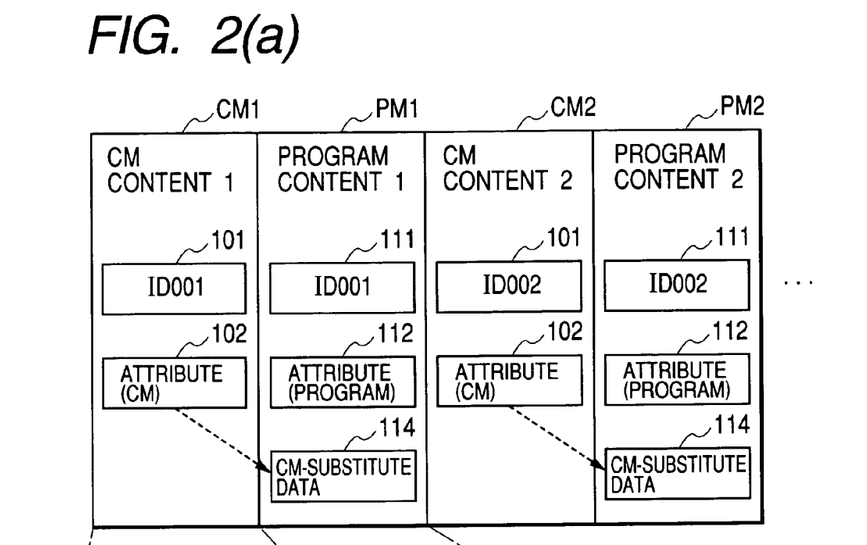
FIGS. 2A and 2B are schematics showing examples of organization of CM contents and program contents.

The video signals output from the incorporation unit 18 are displayed on a monitor display 20 which may be, for example, a CRT, liquid crystal display, or plasma display. If CM-substitute data has been incorporated into program video data, a bitmap image 22 of CM-substitute information is superimposed on the displayed video 21 of the program data on the monitor display 20, as shown in FIG. 1. Then, video data organization will be explained with reference to FIG. 2. In FIG. 2A, two sets of content blocks (one set of CM1 and PM1 and another set of CM2 and PM2) are shown. One content block set consists of a CM content and a program content. In the example shown, the video contents are normally rendered by playback to the TV viewer in the following order: CM content 1 (CM1)→program content 1 (PM1)→CM content 2 (CM2)→program content 2 (PM2). Further time sequenced content blocks follow, CM content 3, program content 3, CM content 4, program content 4, and so on, which are not shown in this figure, because of the same organization.

A CM content consists of commercial data (CM data), ID code 101, and attribute data 102; the latter two being incorporated into the commercial data. A program content consists of program data, ID code 111, attribute data 112, and CM-substitute data 114; the latter three being incorporated into the program data. Each content block may include a plurality of commercial data or program data.

An ID code identifies a content block set of program data and commercial data and indicates the position of the content block set in sequence in which the video contents will be rendered. Respective ID codes are assigned to all content blocks such that a same ID code is assigned to a content block set and its value increments as the position of the content block set becomes later in the above sequence. Attribute data indicates the attribute of data and is used for discrimination between program data and commercial data. If a content block set is predefined in which commercial data precedes program data in time sequence, attribute data also indicates the time sequence of these data.

CM-substitute data in a program data is associated in advance with the commercial data coupled with the program data. If the commercial data has not been rendered normally in a playback process, its CM-substitute data is incorporated into the program data so that the CM-substitute information will be rendered with the program data. As the CM-substitute information, for example, a sponsor name from the associated commercial data and a commodity or service name to be advertised by the commercial data can be mentioned. Such name information may be rendered in text, pictures, audible information, or combination thereof. It is preferable to render CM-substitute information so that it is shown in position not interfering with the view of the program video in which the substitute information is incorporated. Specifically, it is preferable to show CM-substitute information in a suitable position, such as, for example, at the foot or the corners of the display 20 screen, not to interfere with the view of the program video, and silently not to interfere with the sound that accompanies the video. From an opposing perspective, according to circumstances, it is possible to render CM-substitute information so that it is shown in a position in which the information interferes with the normal view of the program video.

Figure 2B:
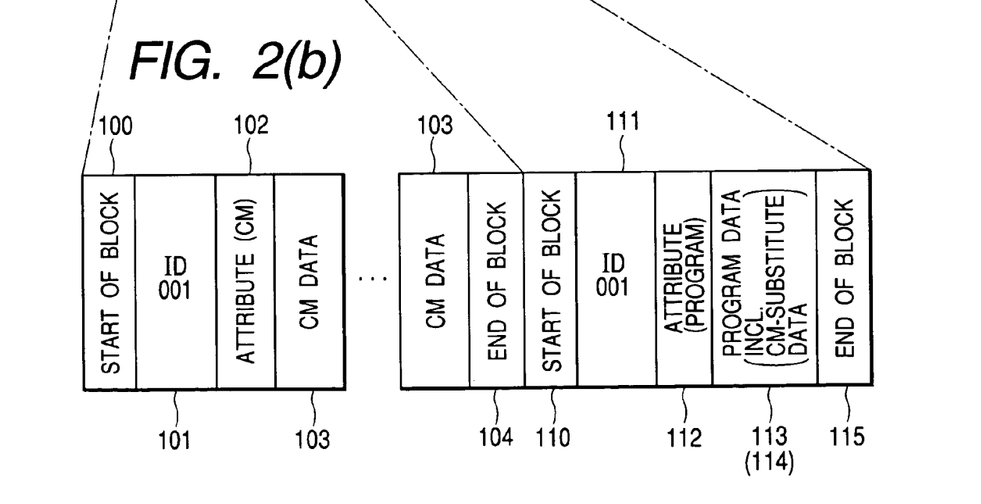

It is also possible to arrange data of video contents in time sequence without incorporating additional data in commercial data and program data, as shown in FIG. 2B. As shown in FIG. 2B, a CM content can be constituted by ID code 101 which is preceded by a start of block signal 100, attribute data 102, and a plurality of CM data 103, the last one of which is followed by an end of block signal 104. Similarly, a program content can be constituted by ID code 111 which is preceded by a start of block signal 110, attribute data 112, and program data 113 (in which CM-substitute data 114 is incorporated) which is followed by an end of block signal 115.

Figure 3A:
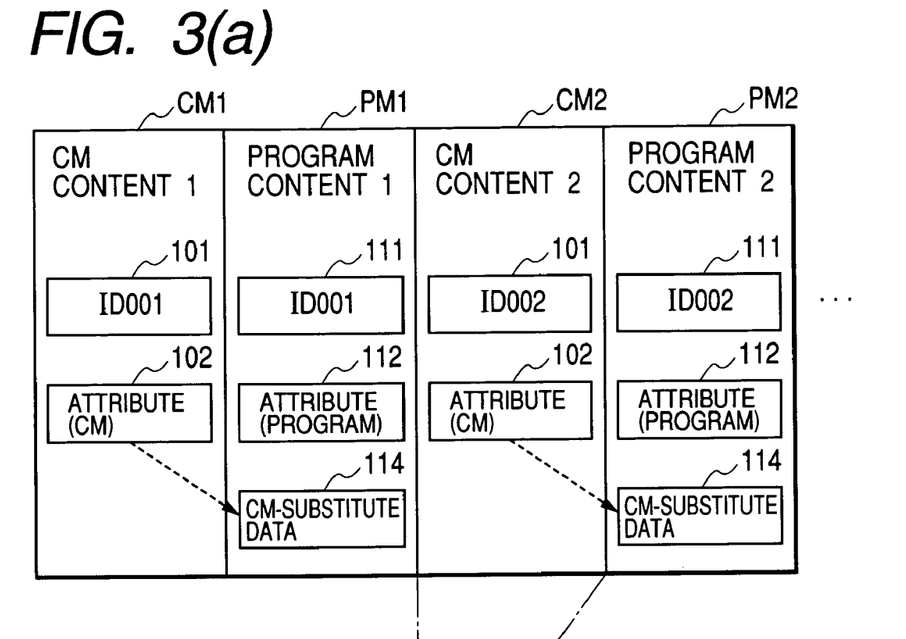
FIG. 3A is a schematic showing the organization of CM and program content blocks.
Figure 3B:
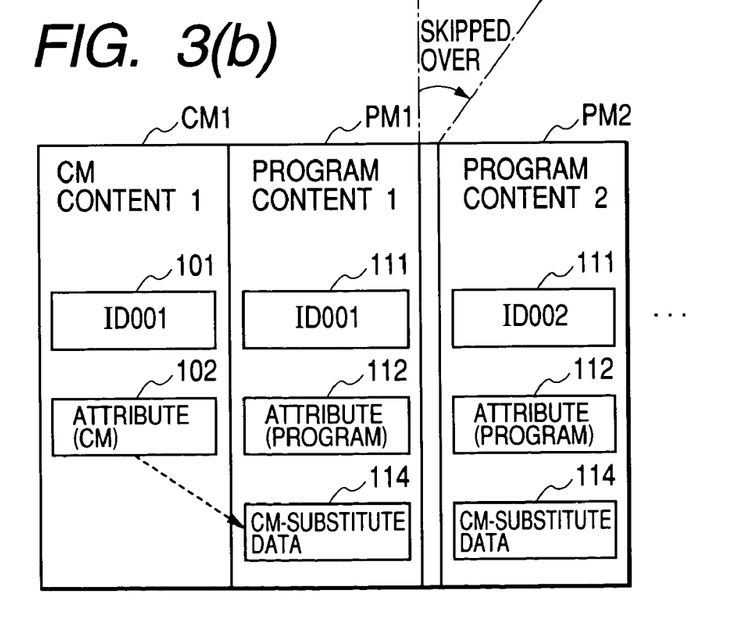
FIG. 3B is a schematic showing the corresponding organization wherein a CM content was skipped over.

FIG. 3A shows the organization of CM and program content blocks and FIG. 3B shows the corresponding organization wherein a CM content was skipped over. As shown in FIG. 3A, CM content 1 (CM1), program content 1 (PM1), CM content 2 (CM2), and program content 2 (PM2) are stored on the storage unit 12 in order of mention, and read, decompressed, and rendered by playback in this order.

However, the viewer may disable rendering of all or a part of commercial data in a playback process, using the operation interface, while the commercial data is stored on the storage unit 12, or all or a part of commercial data may not be stored on the storage unit 12. In such cases, all or a part of commercial data is not rendered by playback.

FIG. 3B shows the corresponding organization in which all CM content 2 (CM2) was not rendered by playback. In this case, a playback process is performed such that program content 2 (PM2) is rendered immediately after program content 1 (PM1) is rendered.

Figure 4:
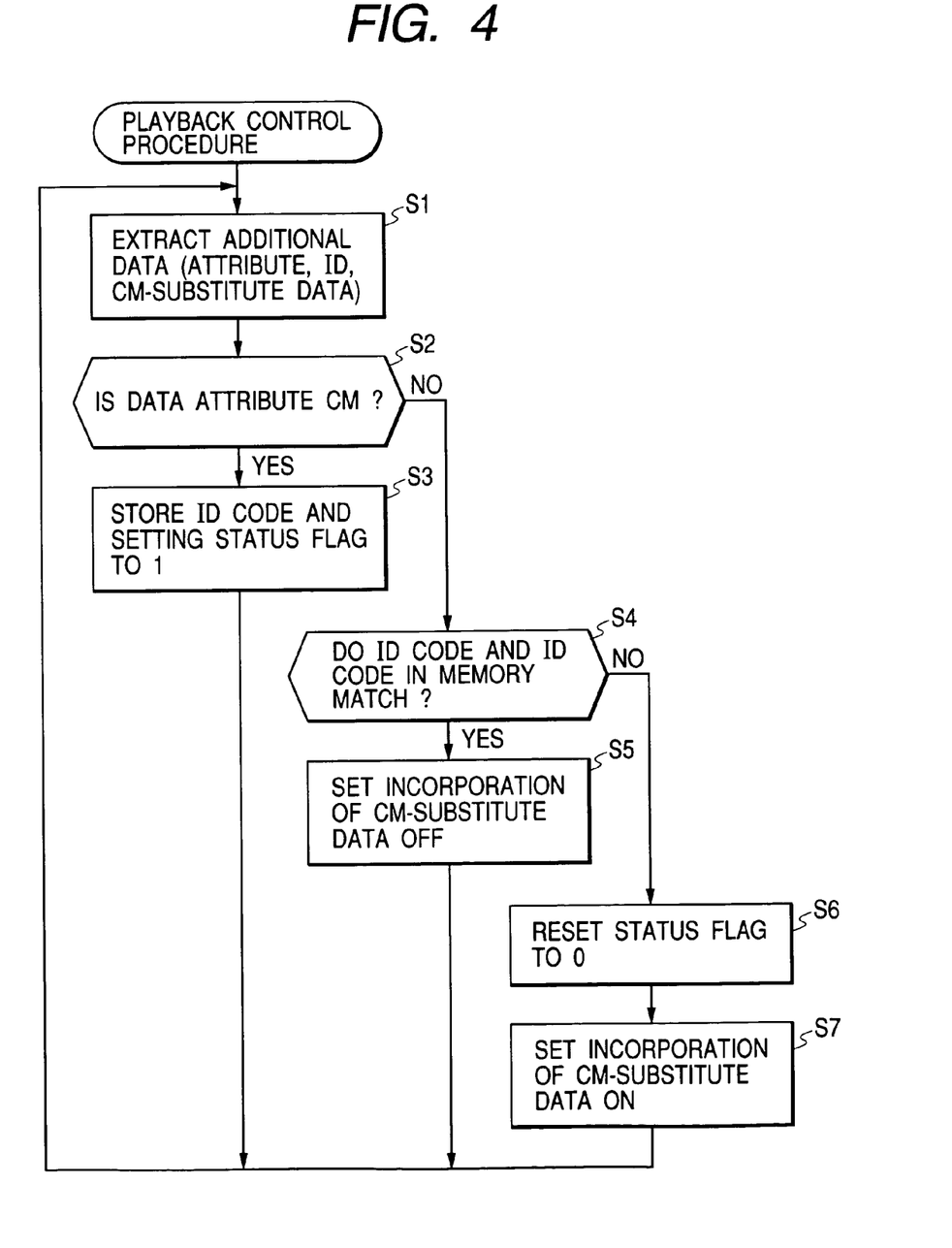
FIG. 4 is a flowchart illustrating a playback control procedure.

FIG. 4 is a flowchart illustrating the outline of a playback control procedure which is performed mainly by the incorporation control unit 16, wherein a step is abbreviated to S.

After data (either program data or commercial data) is read from the storage unit 12, the first step (S1) to do is extracting additional data (ID code, attribute data, and CM-substitute data) incorporated and embedded in that data from it.

The next step (S2) to do is judging whether the attribute of the data read from the storage unit 12 is CM or program. If the data attribute is CM, what next to do is storing the ID code extracted from the commercial data into a predetermined memory area and setting a status flag to 1 and the procedure terminates (S3). The commercial data read from the storage unit 12 is decoded by the decoding unit 14 and its video is displayed through the incorporation unit 18 on the monitor display 20. On the monitor display 20, only the video of the commercial data is displayed (with sound if the video is accompanied by sound; the same will be true for video display operation which will be described hereinafter).

The procedure then returns to step 1 (S1) where program data in the same content block set, associated with the commercial data from which the commercial video has just been rendered, is read from the storage unit 12 and the additional data extraction unit 15 extracts additional data from the program data. Step 2 (S2) is then performed to judge whether the data attribute is CM or program. If the judgment by data attribute is program data (S2, the NO branch), it is determined whether the ID code extracted from the program data matches the. ID code stored in the memory area (S4). If both ID codes match, the match indicates that the commercial data and program data in the content bock set are rendered normally and, in the next step (S5), incorporation of CM-substitute data is disabled. Then, the decoded program data is output to the monitor display 20 through the incorporation unit 18 and its video is rendered. CM-substitute data generated by the substitute data conversion unit 17 is not incorporated in the program data and only the video from the program data is displayed on the monitor display 20.

If a set of CM and program content blocks is retrieved wherein the CM content block includes a plurality of commercial data and the program content block includes a plurality of program data, the above-described process is repeated as many times as the number of data constituting the set.

Explaining the procedure for a case where a commercial data is skipped over in a playback process, as shown in FIG. 3B, after the judgment of step 2 (S2) where the read data is judged as program data by its attribute, it is determined whether the ID codes match in step 4 (S4).

If CM content 2 (CM2) is skipped over in the reading or playback process and program data 2 (PM2) is going to be rendered immediately after program content 1 (PM1) is rendered, as shown in FIG. 3B, the ID code stored in the memory is "001", whereas the ID code of the program data that has just been read is "002." Thus, there is a mismatch between both ID codes (S4, the No branch) and commercial data skipped over in the playback process has been detected. Consequently, the status flag is reset to 0 (S6) and CM-substitute data is incorporated into the program data (S7), and then, the program video is displayed (S7). More specifically, the incorporation unit 18 incorporates the generated CM-substitute data into the program data and the CM-substitute information is superimposed in a predetermined position on the program video which is displayed on the monitor display 20.

Figure 5A:
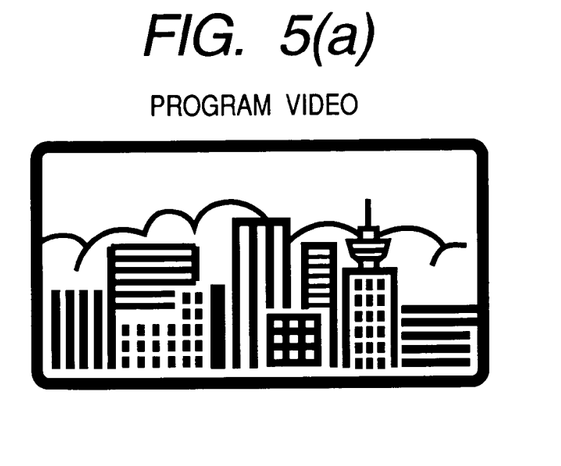
FIG. 5A shows an example of program video.
Figure 5B:
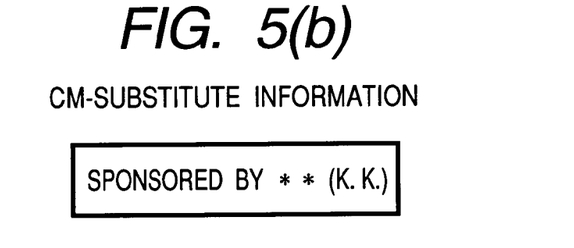
FIG. 5B shows an example of rendered CM-substitute information.
Figure 5C:
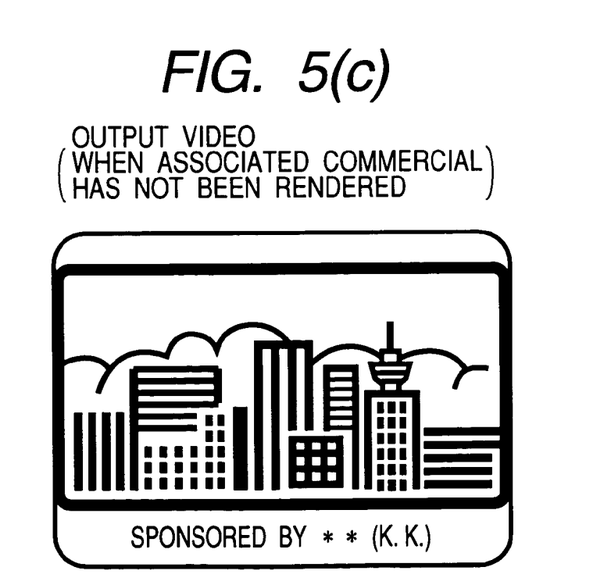
FIG. 5C shows the program video into which the CM CM-substitute information has been incorporated.

FIG. 5A shows a part of video from decoded program data (one frame of video). FIG. 5B shows rendered CM-substitute information. When the incorporation control unit 16 sets incorporation on, the CM-substitute information is superimposed in a predetermined position on the program video, as is shown in FIG. 5C.

According to Embodiment 1, as explained above, when a playback process has skipped over a CM content block so that additional data cannot be extracted from the CM content, CM-substitute data embedded in the program content following the CM data is incorporated into the program data and output to the display and the program content including the CM-substitute information is rendered by playback.

Even if CM content has not been rendered by playback, CM-substitute data is incorporated into the program video associated with the CM and CM-substitute information can be displayed as an auxiliary for the commercial that was skipped over and its advertisement effect to a certain extent can be preserved. In a sense, CM-substitute data embedded in program data is a backup for commercial data associated with the program data and functions as insurance against a missing commercial.

Because CM-substitute data has been embedded in program data by using a digital watermarking technique, only its rendered information cannot be skipped over and this information can cause the viewer to see auxiliary advertisement.

2. Embodiment 2

Now, a preferred Embodiment 2 of the present invention will be described with reference to FIGS. 6 and 7. A feature of Embodiment 2 is as follows. When CM content has not been rendered by playback, CM-substitute data is incorporated into the program content associated with the CM so that rendering of the CM-substitute information is limited to a predetermined number of times; that is, incorporating the CM-substitute data into a certain range of program video frames associated with the CM content without doing unconditionally into all frames of program content.

Figure 6:
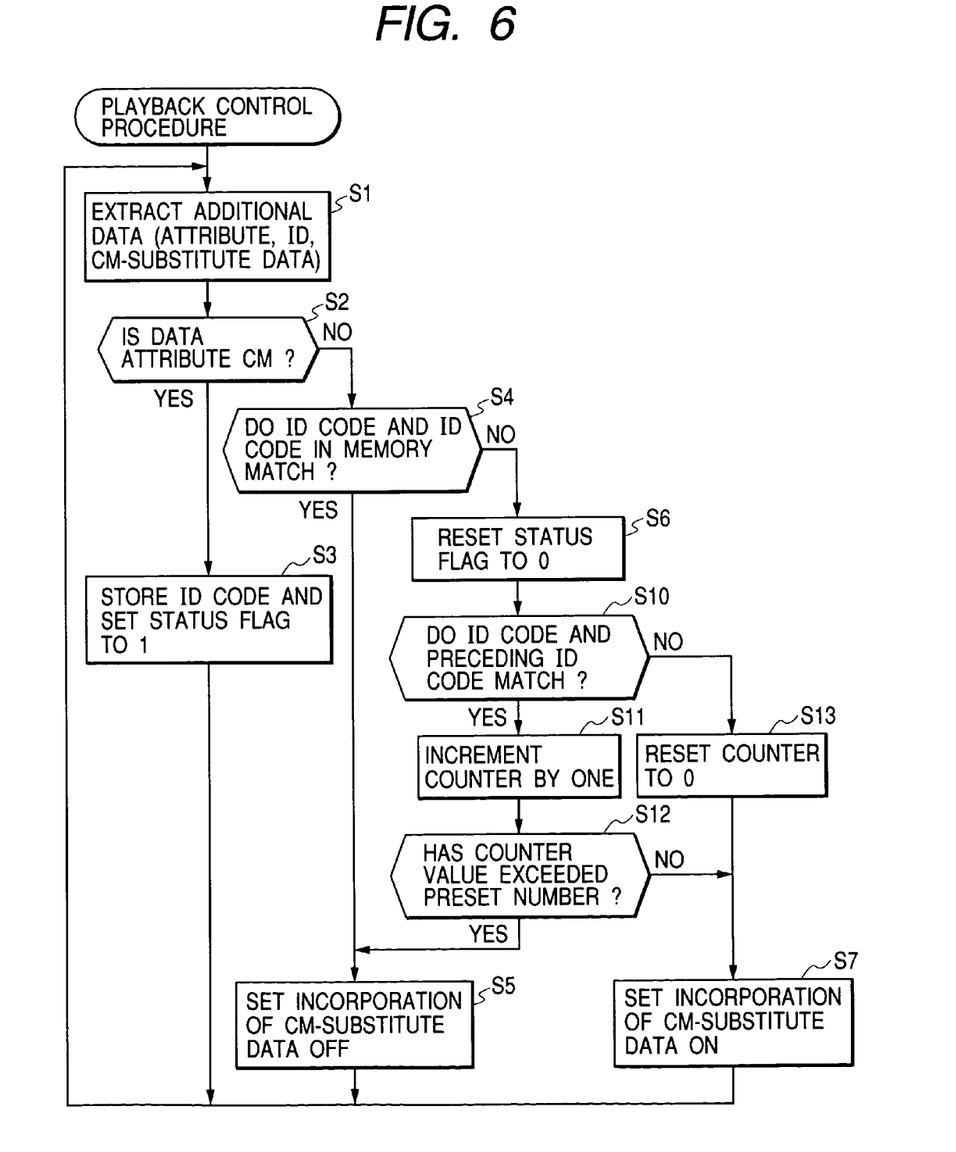
FIG. 6 is a flowchart of a playback control process in accordance with a preferred Embodiment 2 of the present invention.

FIG. 6 is a flowchart illustrating a playback control process in accordance with Embodiment 2. When there is a mismatch between the ID code in the memory and the ID code of the data from which video is going to be rendered by playback (S4; the NO branch) and the status flag is reset to 0 (S6), a CM-substitute information rendering times control process which is added in Embodiment 2 is executed (S10 to S13).

It is determined whether the ID code of the data from which video is now going to be rendered matches the preceding ID code (S10). If both ID codes match, the match indicates successive video rendering of the next program data in the same content block and the value of a counter that counts the number of rendering times is incremented by one (S11) It is determined whether the counter value has exceeded a preset number (S12). If the counter value has not yet exceeded the preset number, CM-substitute data is incorporated into the program data (S7), so that program video including the CM-substitute information is displayed. If the counter value has exceeded the preset number (S12; the YES branch), the incorporation of CM-substitute data is disabled (S5).

If another CM content has been skipped over successively, new program content rendering is performed. In this case, the content ID code differs from the preceding one (S10; the NO branch) and, therefore, the counter is reset to 0 (S13) and CM-substitute data is incorporated into the program video data (S7).

Figure 7:
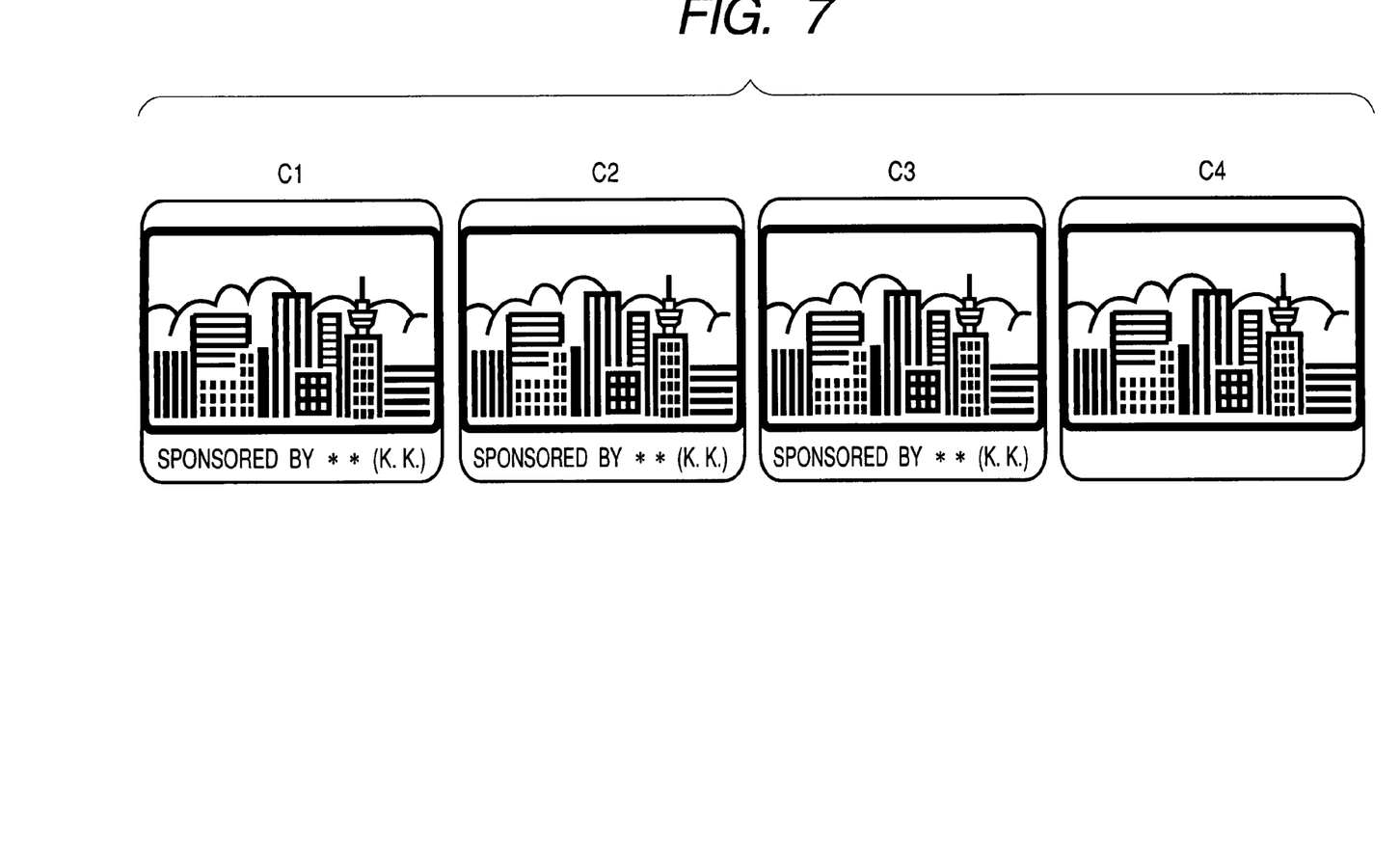
FIG. 7 is illustration which explains incorporating CM-substitute information into a predetermined number of video frames.

In consequence, as is shown in FIG. 7, when the program video is displayed, it includes CM-substitute information in frames C1 to C3 but does not include CM-substitute information in the fourth frame C4 for which the rendering number counter value has exceeded the preset number (in this example, the present number is 3).

In Embodiment 2, as described above, incorporating CM-substitute data into program video data is performed a predetermined number of times and, consequently, the advertisement function remains performing to a certain extent, while the viewer can view the program video in normal state after CM-substitute information is superimposed on the video in the predetermined number of frames. Accordingly, the retention of the advertisement function can be made compatible with video device usability for the viewer and the usability of the invented system and device is improved.

Initial setting of the maximum number of times of rendering CM-substitute information, which must be predetermined, may be set and stored on the storage unit of video recording/playback device 10 or set and attached to the ID code or attribute data incorporated in program data.

3. Embodiment 3

Now, a preferred Embodiment 3 of the present invention will be described with reference to FIG. 8. A feature of Embodiment 3 is setting a time limit to rendering CM-substitute information.

Figure 8:
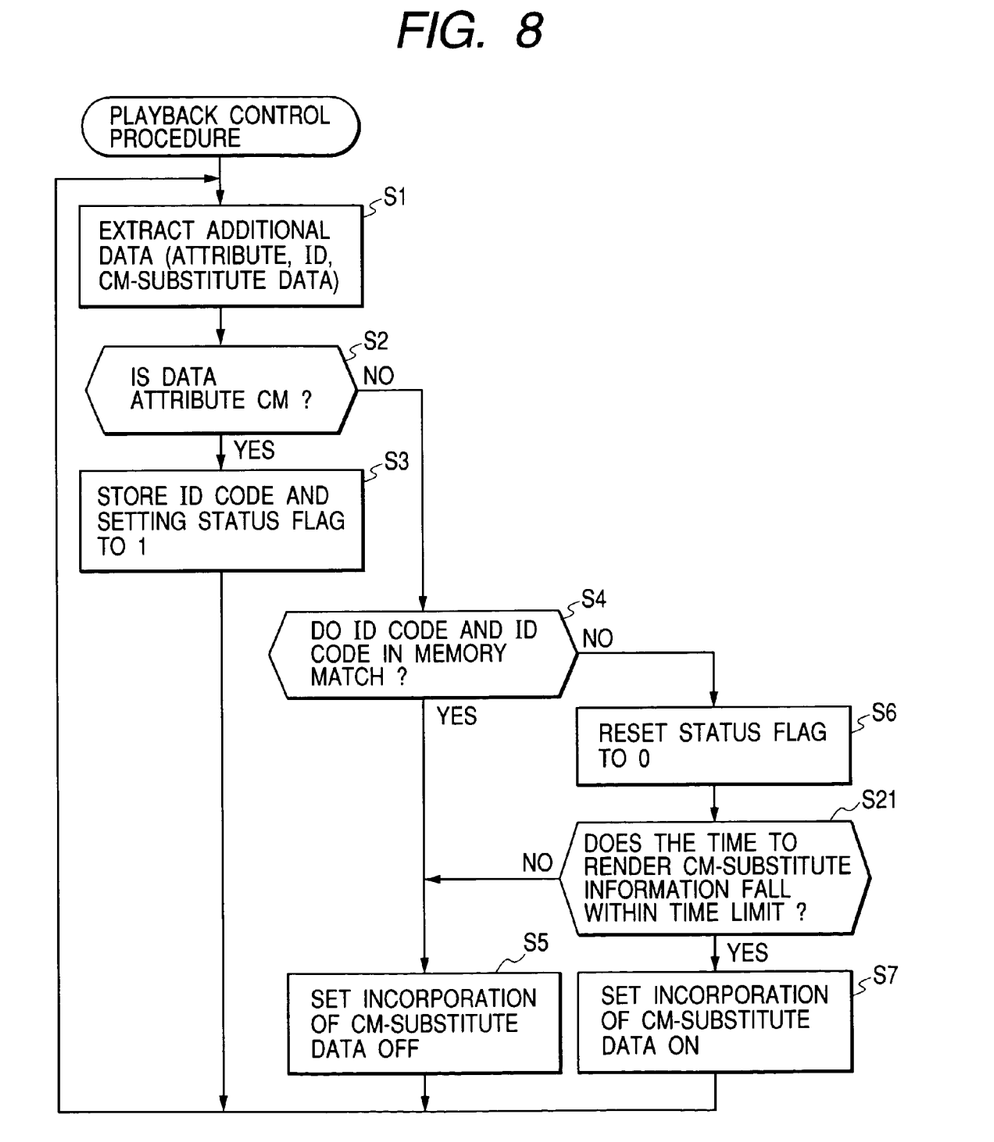
FIG. 8 is a flowchart of a playback control process in accordance with a preferred Embodiment 3 of the present invention.

FIG. 8 is a flowchart illustrating a playback control process in accordance with Embodiment 3. After the status flag is reset to 0 (S6), it is determined whether the time to render CM-substitute information falls within a time limit, that is, whether the time is within a time band during which incorporation of CM-substitute data and rendering of its information are permitted (S21). If the time falls out of the time band (S21; the NO branch), the incorporation of CM-substitute data is disabled (S5). As long as the time falls within the time band, CM-substitute data is incorporated into program video data (S7).

For setting a time limit, different methods can be taken. One method is to compare the present time measured by the video recording/playback device 10 with a preset time band during which rendering CM-substitute information is permitted (from time o'clock and in minutes to time o'clock and in minutes between which incorporation of CM-substitute data is permitted). Another method is to permit rendering CM-substitute information for a predetermined time after the start of the rendering. Either method may be taken. As noted hereinbefore, again, a time band during which rendering CM-substitute information is permitted may be initially set and stored on the storage unit of the video recording/playback device 10 or set and attached to the ID code and attribute data incorporated in program data.

According to Embodiment 3, incorporating CM-substitute data into program video data is enabled for only a predetermined time or within a predetermined time limit. As is the case for the foregoing Embodiment 2, it is possible retain the advertisement function by rendering CM-substitute information without lowering video device usability for the viewer.

4. Embodiment 4

Figure 9:
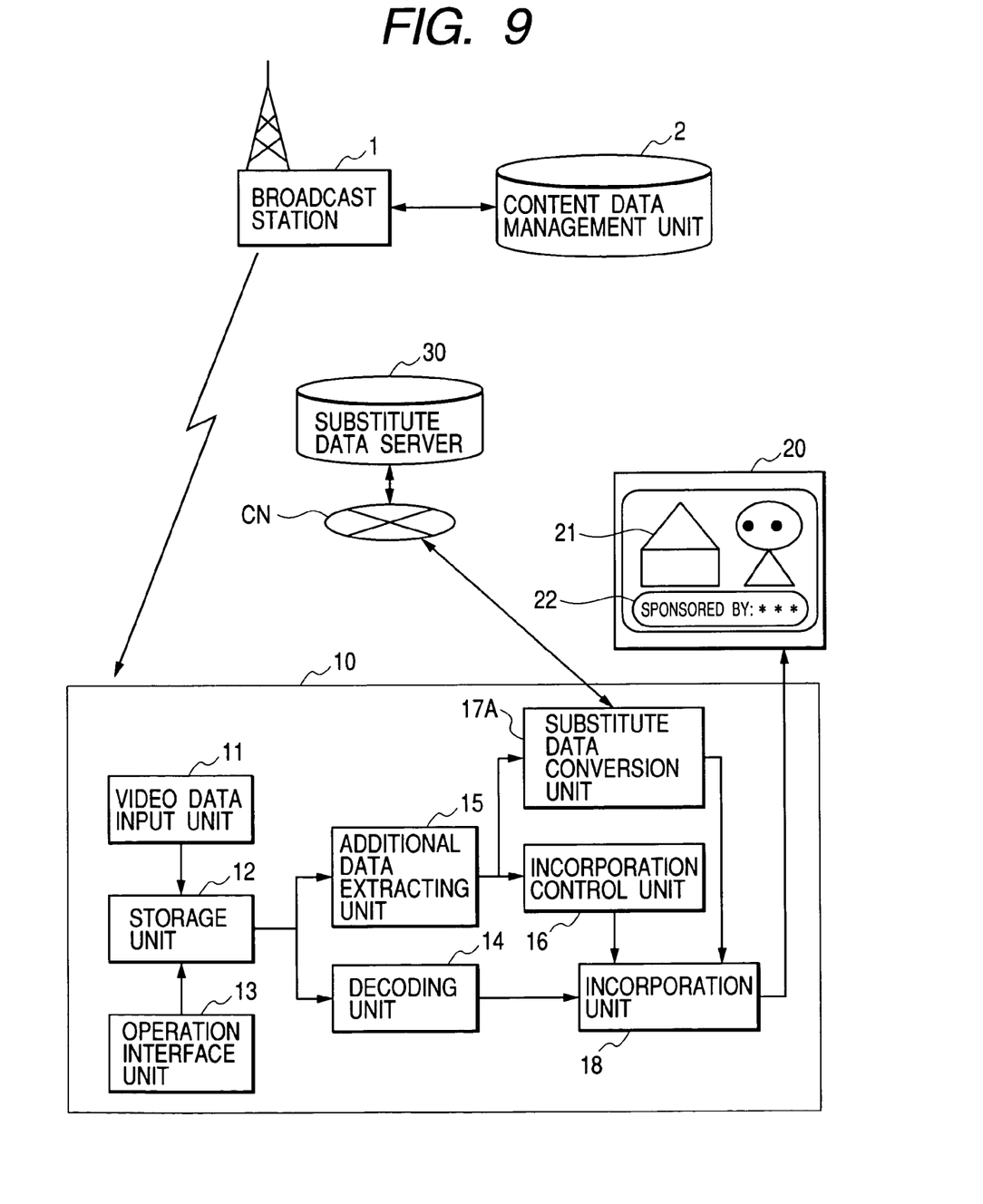
FIG. 9 is a schematic diagram showing an entire configuration of a video recording/playback system in accordance with a preferred Embodiment 4 of the present invention.

FIG. 9 is a schematic diagram showing an entire configuration of a video recording/playback system in accordance with a preferred Embodiment 4 of the present invention. A feature of Embodiment 4 is that program data includes the address of CM-substitute data and the CM-substitute data to be incorporated into program video data is stored on internal or external storage.

The substitute data conversion unit 17A in accordance with Embodiment 4 gets the address of CM-substitute data extracted from program data, accesses a substitute data server 30, and retrieves the CM-substitute data existing at the address via a communication network (CN) such as the Internet. The address of CM-substitute data embedded in program data is, for example, description in an Uniform Resource Locator (URL) which indicates where the CM-substitute data exists.

Instead of storing CM-substitute data on the external server 30, it is also possible to store CM-substitute data into a predetermined storage area on the storage unit 12 of the video recording/playback device 10. It is also possible to use both the internal storage 12 and the external storage 30.

5. Embodiment 5

Figure 10:
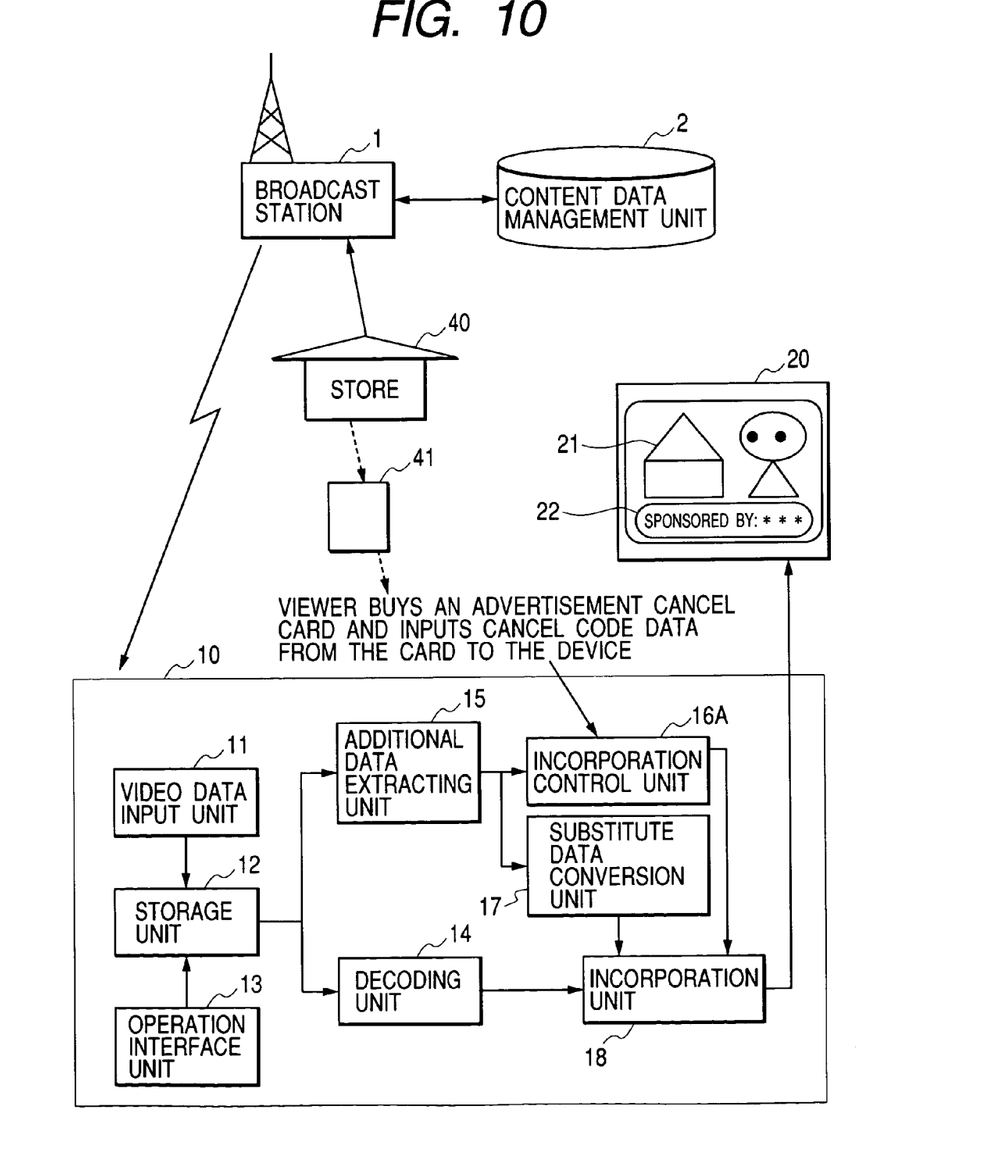
FIG. 10 is a schematic diagram showing an entire configuration of a video recording/playback system in accordance with a preferred Embodiment 5 of the present invention.

FIG. 10 is a schematic diagram showing an entire configuration of a video recording/playback system in accordance with a preferred Embodiment 5 of the present invention. A feature of Embodiment 5 is that an article of commerce having code data for disabling incorporation of CM-substitute data into program data is sold on the market and CM-substitute information can be restrained from being rendered after the code data is input to the video recording/playback device.

At stores 40 such as convenience stores, electronics stores, or supermarkets, an advertisement cancel card 41 that is provided by a broadcast station 1 is sold.

When the viewer inputs a cancel code recorded on the advertisement cancel card 41 to the video recording/playback device 10, it becomes impossible to incorporate CM-substitute data into program data and render its information. On the face of the advertisement cancel card 41, it is also possible to print information such as a sponsor name, commodity name, or program title.

The cancel code may be input to the device in several ways. For example, the viewer may manually enter the cancel code printed on the advertisement cancel card 41 through the operation interface unit 13. Alternatively, the advertisement cancel card 41 may be configured as a memory card or PC card and the cancel code may be input to the device automatically by inserting the card into a card slot provided in the video recording/playback device 10. Alternatively, if the advertisement cancel card 41 is provided with a mechanism for wireless communication at close range, taking advantage of induced electromotive force, the cancel code could be input to the device without bringing the card in contact with the device.

Furthermore, for example, it may be possible to transmit the advertisement cancel code to a mobile data terminal of the viewer (such as a cellular phone, personal digital assistant, and small personal computer), store the code thereon, and transmit the cancel code from the viewer's mobile data terminal to the video recording/playback device 10.

Alternatively, if the video recording/playback device 10 is connected to a communication network and its network address is identifiable, it also may be possible to transmit the cancel code directly from the broadcast station 1 or store 40 to the video recording/playback device 10.

It will be appreciated that the present invention is not limited to the illustrative embodiments described hereinbefore. The invention may be embodied by any person skilled in the art to which it pertains in other modified forms without departing from its spirit or essential characteristics, by adding new components to the device and system configurations shown in the described embodiments, deleting or changing some components.

Other than cases where entire commercial data is skipped over, for example, when only I pictures out of MPEG data are rendered by playback or when the device is put in a fast-forward mode by a skip command after the start of commercial rendering, the device will determine that the user cannot view the complete commercial information. Upon the detection of a skip during a playback process, the device controls the playback such that substitute information for the skipped commercial will be superimposed on the following program video rendered.

As described in detail hereinbefore, even if sub data has not been rendered by playback, the video recording/playback device 10 of the present invention renders its main video accompanied with substitute information for the sub data, so that the substitute information can draw the viewer's attention to the presence of the sub data.

While we have shown and described several embodiments in accordance with our invention, it should be understood that disclosed embodiments are susceptible of changes and modifications without departing from the scope of the invention. Therefore, we do not intend our invention to be bound by the details shown and described herein, but intend our invention to cover all such changes and modifications which fall within the ambit of the appended claims.

We claim:

1. A video recording/playback system for recording and playback of video data received, comprising:
   a memory which receives and stores video data which consists of sets of main data and sub data falling under different categories, the sets of main data and sub data being associated and sequenced along time axis wherein in a set of main data and sub data an ID code and substitute data are embedded in advance, said ID code identifying said set of main data and sub data, said substitute data being associated with said sub data, and the same ID code as assigned to said main data is assigned to said sub data;
   a playback unit which reads out main data and sub data from said memory and renders video contents of these data; and
   a controller which, when said main data stored in said memory is rendered, detects an ID code assigned to said main data, compares the detected ID code with an ID code assigned to said sub data stored in said memory and judges whether said sub data associated with said main data under rendering has already been read from said memory and its video rendered and, unless said detected ID code assigned to said main data agrees with said ID code assigned to said sub data stored in said memory, regards said sub data video as not having been rendered and changes substitute data embedded in said main data and associated in advance with said sub data into video data and incorporates said substitute data into said main data and makes said video data render when said main data is rendered.

2. The video recording/playback system according to claim 1, wherein said main data is program data and said sub data is commercial data.

3. The video recording/playback system according to claim 1, wherein said main data and said sub data include attribute data which indicates the attribute of said set of main data and sub data and said controller judges by said detected ID code and said attribute data whether said sub data has been rendered.

4. The video recording/playback system according to claim 1, wherein said main data includes substitute information rendering limit data for setting a limit to rendering said substitute data.

5. The video recording/playback system according to claim 4, wherein said substitute information rendering limit data is specified so that said substitute data will be rendered in a certain range of frames of said main data associated with said sub data which has not been rendered.

6. The video recording/playback system according to claim 4, wherein, as said substitute information rendering limit data, the number of times said substitute data is to be rendered or a time range within which said substitute data is to be rendered are set.

7. The video recording/playback system according to claim 1, wherein said main data includes a substitute data address instead of said substitute data, the substitute data address specifying where the substitute data has been stored in advance on said memory or another memory on a network.

8. The video recording/playback system according to claim 1, wherein input of a cancel code for disabling the rendering of said substitute data makes it impossible for said controller to incorporate said substitute data into said main data and render main video accompanied with said substitute data.

9. The video recording/playback system according to claim 1, wherein said substitute data is the name of an advertiser, a corporate logo, or a commodity name to advertise which substitutes for said sub data.

10. A method for generating video data, comprising the steps of:
   receiving video data which consists of sets of main data and sub data falling under different categories, said sets of main data and sub data being associated and sequenced along time axis wherein in a set of main data and sub data an ID code and substitute data are embedded in advance, said ID code identifying said set of main data and sub data, said substitute data being associated with said sub data, and the same ID code as assigned to said main data is assigned to said sub data;
   storing the received video data in a memory; and
   reading out said main data from said memory and rendering it;
   wherein in the step of said rendering:
   said ID code assigned to said main data is detected;
   said detected ID code is compared with said ID code assigned to said sub data stored in said memory;
   judging whether said sub data associated with said main data under rendering has already been read from said memory and its video rendered is executed according to the result of the comparison; and
   detected ID code assigned to said main data agrees with said ID code assigned to said sub data stored in said memory, said sub data video is regarded as not having been rendered and said substitute data embedded in said main data is changed into video data and said substitute data is incorporated into said main data.

11. The method for generating video data according to claim 10, wherein said main data is program data and said sub data is commercial data.

12. The method for generating video data according to claim 10, wherein said main data and said sub data include attribute data which indicates the attribute of said set of main data and sub data and it is judged by said detected ID code and said attribute data whether said sub data has been rendered.

13. The method for generating video data according to claim 10, wherein unless sub data with a same ID code as assigned to main data which is being rendered has been read out from said memory and rendered, said substitute data associated in advance with said sub data which has not been rendered is incorporated into said main data and its information is rendered accompanying main video.

* * * * *